Dec. 25, 1956  D. T. HUFFMAN  2,775,090
SIDE DELIVERY WINDROWER
Filed June 5, 1953  3 Sheets-Sheet 2
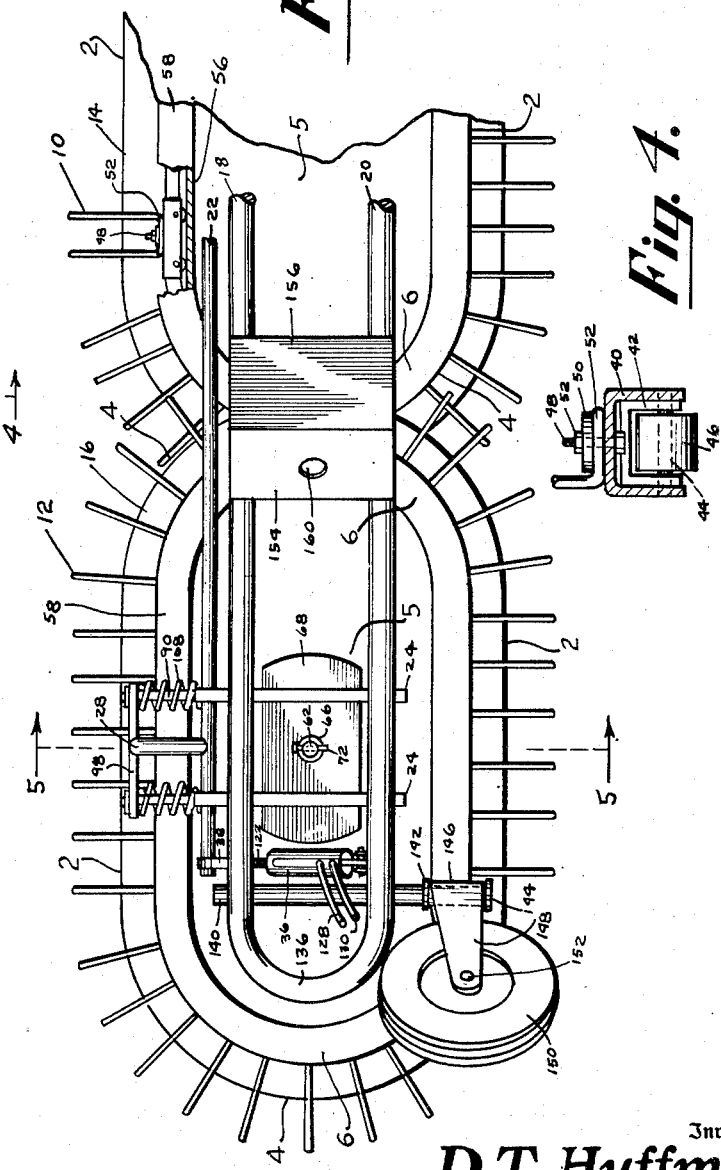
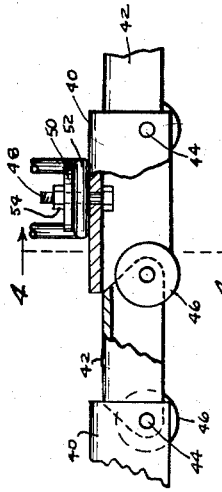
Inventor
D. T. Huffman
By Arthur H. Sturges
Attorney Dec. 25, 1956   D. T. HUFFMAN   2,775,090
SIDE DELIVERY WINDROWER
Filed June 5, 1953   3 Sheets-Sheet 3
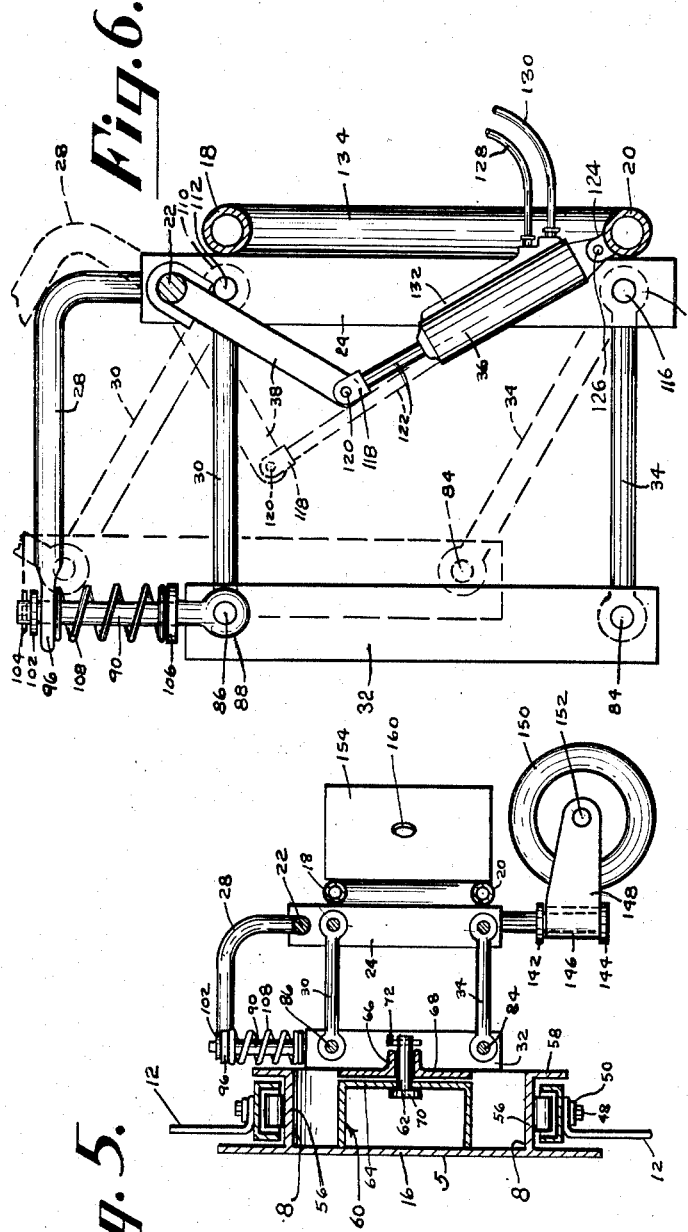
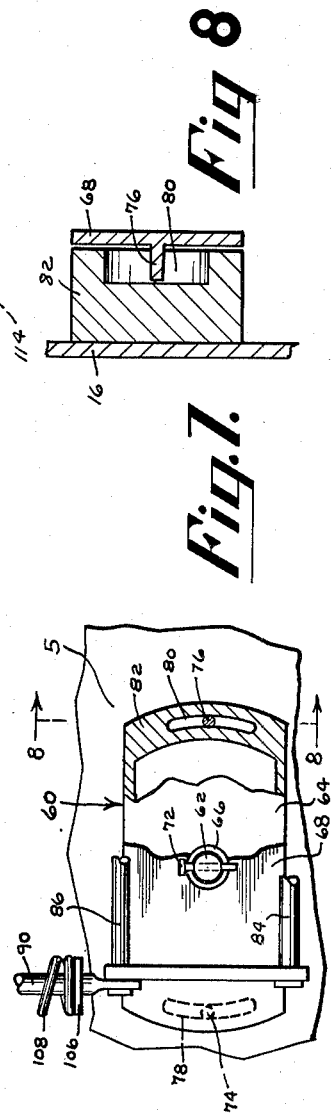
Inventor
D. T. Huffman
By Arthur H. Sturges
Attorney

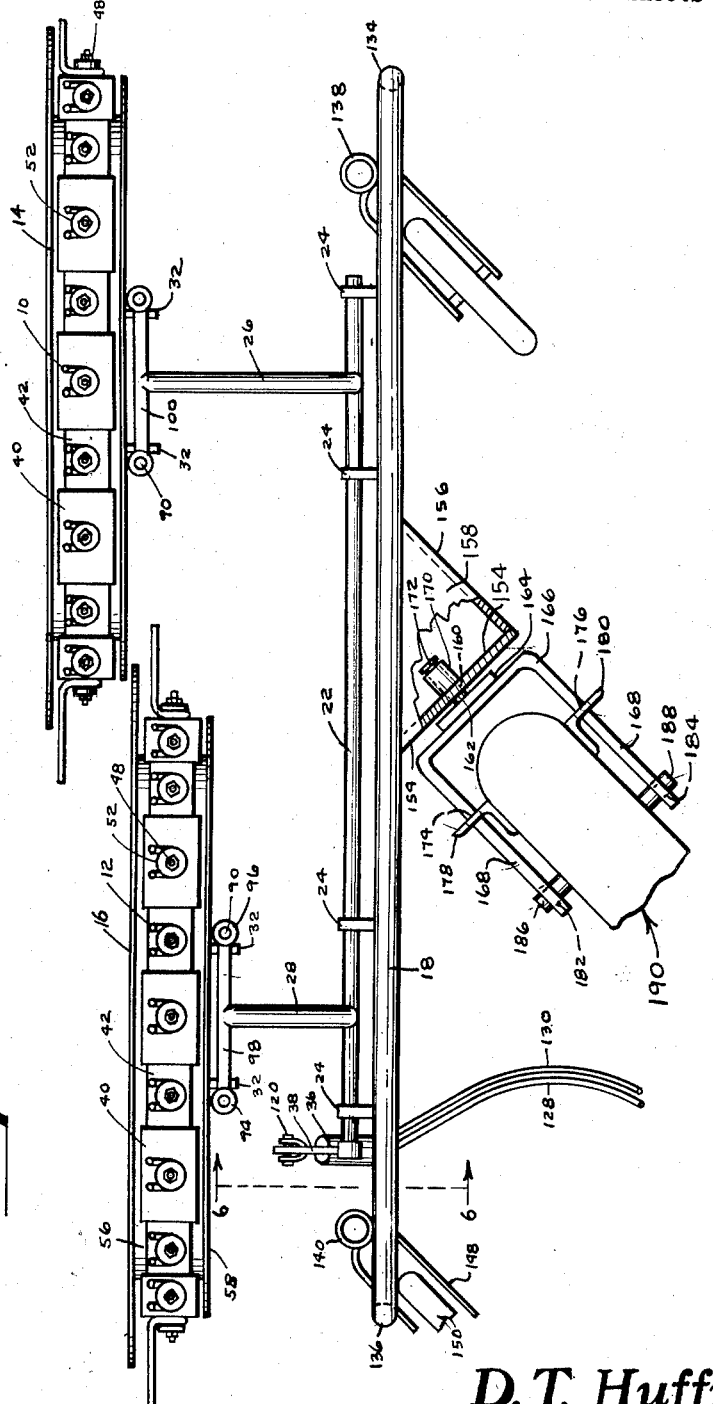

United States Patent Office 2,775,090
Patented Dec. 25, 1956

2,775,090

SIDE DELIVERY WINDROWER

Dan T. Huffman, Decatur, Nebr.

Application June 5, 1953, Serial No. 359,759

8 Claims. (Cl. 56—376)

This invention relates to farm machinery and particularly hay harvesting equipment wherein dry hay is gathered into windrows to facilitate picking up the hay with baling machines and the like, and in particular a windrower attachment adapted to be mounted on the forward end of a tractor and including angularly disposed frames having prongs extended from endless chains slidably mounted on tracks carried by the frames whereby upon forward movement of the tractor engagement of the prongs with the ground causes the chains to travel with the prongs bending and wherein upon leaving the ground the prongs snap upwardly and laterally throwing hay from the leading set of prongs to a following set and from the following set to a windrow at one side of the windrower.

The purpose of this invention is to provide a windrower which whips hay to one side of the machine with spring steel fingers and in which the operation is continuous, eliminating the necessity of halting the forward travel of the machine periodically to trip hay raking elements to form the windrows.

In the conventional method of curing hay grass is cut, turned at least once, and raked with the rake being released at intervals to form windrows. This requires tripping mechanism and because it is necessary to elevate the rake as it is tripped the length of the rake is limited. Furthermore, with the conventional type of rake it is difficult to recover hay in small pockets or recesses in the ground and, consequently, there is always considerable waste.

With these thoughts in mind this invention contemplates times, spring fingers, or prongs carried by endless chains with the chains slidably mounted in elongated tracks extended around vertically disposed plates adjustably mounted on a frame adapted to be connected to the forward end of a tractor.

The object of this invention is, therefore, to provide a windrower that recovers substantially all hay in a field and that operates with a continuous forward motion.

Another object of the invention is to provide a windrower having spring fingers on endless chains in which the chains are actuated by engagement of the spring fingers with the ground over which the device is being moved by a tractor.

Another important object of the invention is to provide a windrower having spring fingers carried by slidably mounted endless chains in which the mounting elements are provided with vertically yielding resilient members which permit the spring fingers to move upwardly to pass over obstructions, such as hummocks, and the like.

A further object of the invention is to provide a windrower which takes a comparatively wide swath, thereby reducing the number of passes it is necessary for the machine to make in windrowing hay in a field.

A still further object of the invention is to provide a windrower adapted to be attached to a tractor in which the elevation of the windrower is adjustable from the seat of the tractor.

And a still further object of the invention is to provide an improved side delivery windrower which is of a comparatively simple and economical construction.

With these and other objects and advantages in view the invention embodies an elongated mounting frame having upper and lower parallel bars connected at the ends with arcuate sections, caster wheels pivotally mounted on the ends of the frame, a tractor connecting section on the intermediate part of the frame, vertically disposed plates connected to the frame with parallel bars, a hydraulic cylinder for adjusting the elevations of the plates, resilient elements for urging the plates downwardly, and spring fingers extended from edges of the plates and carried by endless chains slidably mounted in tracks on the plates.

Other features and advantages of the invention will appear from the following description taken in connection with the drawings, wherein:

Figure 1 is a plan view of the improved windrower showing the attachment connected to the forward end of a tractor with part of the tractor connecting element broken away and shown in section, and also with part of one of the caster wheels broken away.

Figure 2 is a view with the parts shown on an enlarged scale illustrating the spring finger carrying chain with parts broken away and with parts shown in section.

Figure 3 is a rear elevational view of the windrower attachment with the parts shown on an enlarged scale and with part of one of the sections thereof broken away.

Figure 4 is a detail taken on line 4—4 of Figure 2, showing a cross section through the spring finger carrying chain.

Figure 5 is a cross section taken on line 5—5 of Figure 3 showing the relative positions of the frame, plates, chains, and connecting elements.

Figure 6 is a cross section, somewhat similar to that shown in Figure 5, taken on line 6—6 of Figure 1, showing the hydraulic cylinder for adjusting the elevation of the spring fingers and mounting parts therefor, and with the parts shown on an enlarged scale.

Figure 7 is a rear elevational view with the parts shown on an enlarged scale and with parts broken away and parts shown in section illustrating the swivel mounting of the endless chain carrying plates.

Figure 8 is a cross section taken on line 8—8 of Figure 7 showing one of the pins for limiting the swivel action of the plates.

Referring now to the drawings wherein like reference characters denote corresponding parts the improved side delivery windrower of this invention includes two sets of tines, prongs, or spring fingers, the fingers of the leading set being indicated by the numeral 10 and the fingers of the following set by the numeral 12, a plate 14 upon which the fingers 10 are carried, and a plate 16 upon which the fingers 12 are carried, a mounting frame having an upper rail 18 and a lower rail 20, a shaft 22 pivotally mounted in frame brackets 24 on the inner surface of the frame, L-shaped arms 26 and 28 extended from the shaft to the plates, upper links 30 connecting the upper ends of the brackets of the frame to similar spring finger brackets 32 of the plates, lower links 34 connecting the lower ends of the brackets, and a hydraulic cylinder 36 pivotally mounted on the lower rail of the frame and connected to the shaft 22 with a lever 38.

The fingers and chains upon which the fingers are carried being the same in both sets the same reference characters are used for corresponding parts of each set.

The chains, which are channel-shaped in cross section, are formed with large links 40 and small links 42, and the links are pivotally connected with pins 44 upon which rollers 46 are also mounted. The spring fingers are provided with U-shaped lower ends 52 by which the fingers are secured to the large links 40 with bolts 48 and washers 50, the washers being positioned between the U-shaped ends 52 and the links of the chain and the bolts being provided with nuts 54.

The chains of each set are slidably mounted in tracks having base plates 56, one of the edges of which is secured to the plates 14 and 16 preferably by welding, as indicated by the numeral 8, and the other of the edges thereof being provided with an endless flange 58. By this means, upon forward travel of the windrower by the tractor upon which the windrower is mounted the spring fingers engage the ground and draw the chains rearwardly in the lower sides of the tracks thereby picking up hay from the surface of the ground, in the stubble, and also from cavities in the surface of the ground.

The tracks and also the plates 14 and 16 are substantially oval-shaped having semi-circular ends connected with parallel sides 2, the ends of the plates being indicated by the numeral 4, and the ends of the tracks by the numeral 6, and the intermediate portions 5 of the plates 14 and 16 are provided with mounting boxes 60 having swivel pins 62 extended from centrally positioned openings in outer walls 64 thereof, and the swivel pins extend through hubs 66 of plates 68 upon which the spaced vertically disposed brackets 32 are mounted. Heads 70 of the swivel pins are positioned in the boxes 60 and the extended ends of the pins are provided with keys 72. The plates 68 are provided with pins 74 and 76 that are positioned to travel in arcuate slots 78 and 80, respectively, thereby limiting the rocking movement of the sets of pins. The ends of the boxes are provided with comparatively thick walls 82, as shown in Figures 7 and 8.

The brackets 32 are secured to the outer surfaces of the plates 68 and, as shown in Figures 5 and 7, the lower ends of the brackets are connected with rods 84 and the upper ends with rods 86.

The ends of the upper rods 86 extend through the brackets and eyes 88 of vertically extended rods 90 are secured on the ends of the rods 86 with heads 92. The upper ends of the rods 90 extend through eyes 94 and 96 on the ends of cross bars 98 and 100 to which the ends of the L-shaped arms 26 and 28 are secured, such as by welding. The upper ends of the rods 90 are provided with washers 102 and cotter pins 104, and the lower parts of the rods are provided with collars 106 which provide seats for the lower ends of springs 108, the upper ends of which bear against the eyes 94 and 96 of the cross bars 98 and 100.

The ends of the links 30 are provided with eyes 110 and the eyes at the forward ends are pivotally mounted on the rods 86. The eyes at the opposite ends are pivotally mounted on rods 112 in the upper parts of the brackets 24, and similar eyes 114 of the lower links 34 are mounted on the rods 84 in the brackets 32 and rods 116 in the lower ends of the brackets 24.

The lever 38 extends downwardly from one end of the shaft 22 and the lower end of the lever is pivotally connected to a yoke 118 with a pin 120. The yoke is positioned on the end of a piston rod 122 which extends from a piston in the hydraulic cylinder or jack 36, and the lower end of the cylinder is pivotally connected to tangs 124 of the lower rail 20 on the mounting frame with a pin 126. The cylinder 36 is provided with tubes 128 and 130 for supplying fluid under pressure, the tube 128 extending through a passage 132 to the upper end of the cylinder so that vertically disposed movements of the spring fingers is adapted to be controlled in both directions.

The ends of the upper rail 18 and lower rail 20 of the frame are connected with semi-circular end sections 134 and 136, and posts 138 and 140, which are secured to the rails, are provided with spaced collars 142 and 144 between which hubs 146 of wheel carrying yokes 148 are positioned. Wheels 150 are journaled in arms of the yokes with pins 152, and with the hubs free to rotate on the lower ends of the posts the wheels are adapted to follow the direction of travel of the tractor.

The rails of the mounting frame are provided with a substantially centrally positioned triangular-shaped box-like section having side plates 154 and 156 with end plates 158, and the side plate 154 is provided with an opening 160, which is positioned to receive a pin 162 extended from a base plate 164 on a yoke 166 having arms 168 that provides means for mounting the windrower on a tractor or the like.

The inner surface of the plate 154 is provided with a sleeve 170 that extends around the opening 160 and provides a bearing for the pin 162 which is secured therein by a cotter pin 172 or other suitable locking means. The arms 168 of the yoke extend through slots 174 and 176 of angle bars 178 and 180 secured to the sides of the tractor, and apertures 182 and 184 in the ends of the arms are positioned over pins 186 and 188 extended from the sides of the tractor, which is indicated by the numeral 190.

With the parts assembled in this manner and mounted on a tractor as illustrated in Figure 1, forward motion of the tractor with the spring fingers engaging the ground, will cause the chains to travel in clockwise directions looking forwardly, as shown in Figure 3, and with the spring fingers being bent by engagement thereof with the ground, they will snap upwardly with a whip action as they leave the ground whereby hay raked by the forwardly positioned set of fingers will be thrown in the path of the following fingers, and from the following fingers the hay will be thrown into a windrow at the side of the machine.

This continuous movement of the spring fingers makes it possible for the machine to travel at a comparatively high rate of speed, and because of the width of the machine the number of times the machine travels over a field is greatly reduced. For this reason much less time is required for making or curing hay.

The elevation of the spring fingers is adjusted by the hydraulic cylinder 36 as indicated by the dotted lines in Figure 6.

From the foregoing description it is thought to be obvious that a side delivery windrower constructed in accordance with my invention is particularly well adapted for use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

What is claimed is:

1. A windrower comprising an elongated vertically disposed frame having horizontally positioned upper and lower rails with the ends connected with semi-circular sections, means for mounting the frame on the forward end of a tractor with the frame positioned at an acute angle in relation to the longitudinal axis of the tractor, oval shaped supporting members having elongated parallel edges with semi-circular ends and with the centers of the ends spaced whereby straight horizontally disposed portions are provided on lower edges thereof, continuous tracks, channel-shaped in cross section mounted on the edges of said supporting members, endless chains slidably mounted in said tracks, means for mounting the supporting members on the frame to provide vertical movement of the supporting members and chains, and spring fingers extended outwardly from said chains the spring fingers on lower sections of said chains being adapted to engage the ground upon which a tractor on which the windrower is mounted whereby upon forward movement of the tractor the chains are actuated to carry products gathered by the spring fingers to one side of the device.

2. A windrower comprising an elongated vertically disposed frame having horizontally positioned upper and lower rails with the ends connected with semi-circular sections, means for mounting the frame on the forward end of a tractor with the frame positioned at an acute angle in relation to the longitudinal axis of the tractor, supporting oval shaped plates independently mounted on said frame, said plates having elongated parallel edges with semi-circular ends and with the centers of the ends in spaced relation whereby straight horizontal portions are provided on lower ends thereof, continuous tracks channel-shaped in cross section extended around the peripheral edges of the plates, endless chains slidably mounted in said tracks, and spring fingers extended from said chains, one of said plates being positioned forwardly of the other the spring fingers on lower sections of said chains being adapted to engage the ground upon which a tractor on which the windrower is mounted whereby upon forward movement of the tractor the chains are actuated to carry products gathered by the spring fingers to one side of the device.

3. A windrower comprising an elongated vertically positioned tubular mounting frame having upper and lower rails with the ends connected with semi-circular sections adapted to be positioned on a tractor with the frame positioned at an acute angle in relation to the longitudinal axis of the tractor, a triangular-shaped box-like member having a bearing therein mounted on the rear of said frame, a yoke having a pin journaled in said bearing and having arms adapted to be attached to a tractor, vertically positioned overlapping oval-shaped plates having elongated parallel edges with semi-circular ends and with the centers of the ends in spaced relation whereby straight horizontally disposed portions are provided on lower edges thereof, continuous tracks channel-shaped in cross section mounted on the edges of the plates, arms pivotally mounted on the frame and connected to said plates, endless chains slidably mounted in said tracks, and spring fingers extended from said chains the spring fingers on lower sections of said chains being adapted to engage the ground upon which a tractor on which the windrower is mounted whereby upon forward movement of the tractor the chains are actuated to carry products gathered by the spring fingers to one side of the device.

4. In a ground actuated side delivery windrower, the combination which comprises a frame having parallel upper and lower rails connected at the ends, a bearing mounted on the frame, a yoke journaled in the bearing on the frame and adapted to be mounted on a tractor, a horizontally disposed shaft journaled on the frame, arms extended forwardly from ends of the shaft, vertically positioned oval-shaped plates carried by said arms, said plates being adapted to be positioned on a tractor at an acute angle in relation to the longitudinal axis of the tractor, endless chains slidably mounted on said plates, and spring fingers extended from said chains the spring fingers on lower sections of said chains being adapted to engage the ground upon which a tractor on which the windrower is mounted whereby upon forward movement of the tractor the chains are actuated to carry products gathered by the spring fingers to one side of the device.

5. In a ground actuated side delivery windrower, the combination which comprises a frame, a bearing mounted on said frame, a yoke journaled in the bearing and adapted to be mounted on a tractor, a horizontally disposed shaft journaled on said frame, arms extended forwardly from said shaft, vertically positioned oval shaped plates depending from extended ends of the arms, resilient means in the connections between the arms and plates, upper and lower pairs of links pivotally mounted on the frame and pivotally connected to the plates, said plates being adapted to be positioned on a tractor at an acute angle in relation to the longitudinal axis of the tractor, endless chains slidably mounted on said plates, and spring fingers extended from said chains the spring fingers on lower sections of said chains being adapted to engage the ground upon which a tractor on which the windrower is mounted whereby upon forward movement of the tractor the chains are actuated to carry products gathered by the spring fingers to one side of the device.

6. In a ground actuated side delivery windrower, the combination which comprises a vertically disposed frame, caster wheels pivotally mounted on ends of the frame, a yoke adapted to be mounted on a tractor, means for journaling the frame on the yoke, a horizontally disposed shaft journaled on said frame, arms extended upwardly and forwardly from said shaft, vertically positioned plates with continuous tracks thereon carried by extended ends of the arms, resilient means in the connections of the arms to the plates, upper and lower pairs of links pivotally connected, at one of the ends thereof, to the frame and at the opposite ends to the plates, means for providing a swivel action in the connections between the arms and links and plates, said plates being adapted to be positioned on a tractor at an acute angle in relation to the longitudinal axis of the tractor, endless chains slidably mounted in said tracks, and spring fingers extended from said chains the spring fingers on lower sections of said chains being adapted to engage the ground upon which a tractor on which the windrower is mounted whereby upon forward movement of the tractor the chains are actuated to carry products gathered by the spring fingers to one side of the device.

7. In a ground actuated side delivery windrower, the combination which comprises a vertically disposed frame, a swivel connection for mounting the frame on a tractor, ground engaging wheels for supporting ends of the frame, a shaft having L-shaped arms extended upwardly and forwardly therefrom pivotally mounted on said frame, a hydraulic cylinder mounted on the frame and connected to the shaft for turning the shaft, brackets carried by extended ends of the L-shaped arms, links connecting the brackets to the frame, vertically disposed plates connected to said brackets with swivel connections, and endless chains having spring fingers extended therefrom slidably mounted on said plates, the spring fingers on lower sections of said chains being adapted to engage the ground upon which a tractor on which the windrower is mounted whereby upon forward movement of the tractor the chains are actuated to carry products gathered by the spring fingers to one side of the device, one of said plates being positioned forwardly of the other said plates being adapted to be positioned on a tractor at an acute angle in relation to the longitudinal axis of the tractor, and the spring fingers on the lower sections of the chains being adapted to engage the ground upon which a tractor on which the windrower is mounted is positioned whereby upon forward movement of the tractor the chains are actuated on the plates to carry products raked by the spring fingers to one side of the windrower.

8. In a side delivery windrower, the combination which comprises a mounting frame, frame brackets positioned on said frame, a horizontally disposed shaft pivotally mounted in said brackets, means for mounting the frame on a tractor with the frame positioned at an acute angle in relation to the longitudinal axis of the tractor, L-shaped arms of different lengths on the shaft in the frame brackets, spring finger brackets parallel to and spaced from the frame brackets, upper and lower links pivotally connecting said brackets and coacting with the L-shaped arms for supporting the spring finger brackets, springs positioned between the extended ends of the L-shaped arms and spring finger brackets, vertically positioned plates mounted with swivel connections on said spring finger brackets, endless tracks positioned on said plates, endless chains adapted to slide in said tracks, spring fingers mounted on and extended from said chains, hydraulic cylinders mounted on said frame and connected to said shaft for elevating said spring fingers and chains, the L-shaped arm and links at the trailing end of the frame being shorter than the L-shaped arm and links at the leading end of the frame whereby the unit at the trailing end follows the unit at the forward end and said parts being positioned whereby the unit at the forward end overlaps the unit at the trailing end, said spring fingers being adapted to engage the ground upon which the tractor is positioned whereby forward movement of the tractor actuates the chains.

References Cited in the file of this patent

UNITED STATES PATENTS

| | | |
|---|---|---|
| 1,406,506 | Stansberry | Feb. 14, 1922 |
| 2,494,946 | Ingram | Jan. 17, 1950 |
| 2,511,100 | Clark | June 13, 1950 |
| 2,531,934 | Crose | Nov. 28, 1950 |
| 2,545,723 | Conner | Mar. 20, 1951 |
| 2,712,723 | Ryan | July 12, 1955 |

FOREIGN PATENTS

| | | |
|---|---|---|
| 20,246 | Great Britain | A. D. 1902 |